Aug. 22, 1950     G. REBER     2,519,603
NAVIGATIONAL INSTRUMENT
Filed March 17, 1945     6 Sheets-Sheet 1

Inventor:
Grote Reber,

Aug. 22, 1950 — G. REBER — 2,519,603
NAVIGATIONAL INSTRUMENT
Filed March 17, 1945 — 6 Sheets-Sheet 2

Inventor:
Grote Reber,
By Chritten, Willes Schroeder,
Merriam, Hofgren, Attys.

Aug. 22, 1950  G. REBER  2,519,603
NAVIGATIONAL INSTRUMENT
Filed March 17, 1945  6 Sheets-Sheet 3

Aug. 22, 1950 — G. REBER — 2,519,603
NAVIGATIONAL INSTRUMENT
Filed March 17, 1945 — 6 Sheets-Sheet 4

Aug. 22, 1950   G. REBER   2,519,603
NAVIGATIONAL INSTRUMENT

Filed March 17, 1945   6 Sheets-Sheet 5

Inventor:
Grote Reber,
By Christen, Wiles Schroeder,
Merriam & Hofgren, Attys.

Patented Aug. 22, 1950

2,519,603

UNITED STATES PATENT OFFICE 2,519,603

NAVIGATIONAL INSTRUMENT

Grote Reber, Wheaton, Ill.

Application March 17, 1945, Serial No. 583,236

11 Claims. (Cl. 250—33.63)

This invention relates to a navigational instrument, and more particularly to means for determining the altitude and azimuth of a radiating celestial body, or either of said angular positions, with respect to an observer's position, when said body is above the horizon but obscured from view by atmospheric conditions.

One feature of this invention is that it makes use of electro-magnetic waves of radio frequency emanating from the celestial body for determinations of position; another feature of this invention is that it enables accurate determination of the angular position of a known celestial body, as the altitude and azimuth of the sun, and thus determination of the observer's position, under atmospheric conditions which have heretofore rendered a navigational "sight" impossible; yet another feature of this invention is that the collector means used for picking up the electro-magnetic waves emanating from such a body not only is directional, but also is adapted to have its resolving power varied, to vary the width of its acceptance pattern, so that the general position of the celestial body may first be determined with ease and thereafter its exact position determined with accuracy; and still another feature of this invention is that it is adapted to work at frequencies very suitable for penetration of fog and other atmospheric conditions which absorb and prevent the passage of light, and the frequencies above those wherein any substantial amount of terrestrial interference, or any deviation of the waves from a straight line of travel, would be encountered. Other features and advantages of this invention will be apparent from the following specification and the drawings, in which:

Where an airplane or a ship is in sight of known territory, repeated use of check points may be made and navigation is relatively easy. Where a ship or plane is out of sight of land, however, approximate position may be known from dead reckoning, but accurate determination of position to compensate for drift is possible only when a sight may be taken on some celestial body. It has long been common to take such sights with a sextant, sighting on the sun during the day and on a star during the night. When the time of observation is accurately known, as by use of a chronometer, the altitude and azimuth of the observed celestial body enable the observer, by use of nautical almanacs and tables, or by calculation or both, to determine his latitude and longitude on the earth's surface with a considerable degree of accuracy.

Such determinations of position, however, are impossible when the sky is blotted out by fog, rain, heavy clouds, or any such obscuring atmospheric condition. Under such conditions a ship may go for several days with no knowledge of its position other than that determined by dead reckoning and be considerably off its course. Some other workers in the field of navigating instruments have heretofore endeavored to solve the problem thus presented by measuring solar heat reaching the earth's surface by sensitive thermocouples, bolometers and the like, but none of these methods have been sufficiently accurate to receive commercial acceptance.

I have discovered that certain celestial bodies radiate electro-magnetic energy over a wide frequency band, which emanations I have sometimes heretofore termed "cosmic static." While the frequency limits of this radiation are not now fully known, I have found that it exists in readily measurable quantities in which are generally termed the ultra-high frequencies, as I have made measurements in the neighborhood of 160 megacycles per second, and in the neighborhood of 480 megacycles per second, the frequency acceptance of the equipment in both cases being in the neighborhood of an 8 megacycle band width with the named frequency at the center of such band, but with every effort being made to avoid sharp peaking of the response curve at the median frequency. My experiments indicate that the electro-magnetic waves used for determinations of the positions of a celestial body should have frequencies at least above 100 megacycles; and theoretical considerations indicate that the frequencies should preferably be above 1,000 megacycles but below 300,000 megacycles, as at and above this latter frequency the wave lengths become so short that absorption of the energy by dust and water droplets in the air would be so great as to negative successful operation. At present, however, the upper range of the frequencies to be used is limited only by the equipment available.

My work on cosmic static has indicated the sun to be a sufficiently rich source of electro-magnetic waves of frequencies above 100 megacycles to enable its angular positions at any given time with respect to an observer's location on the earth's surface to be accurately determined by appropriate equipment of the kind which I am here disclosing and claiming. At night, when the sun is not above the horizon, a sight may be taken on some other celestial body radiating similar energy. Certain constellations, particularly Sagittarius, Cygnus, Cassiopeiae and Canis Major provide radiation centers of sufficient intensity for such purposes, since dead reckoning and a nautical almanac enables sufficiently approximate determination of the positions of these constellations to enable the observer to know which one is being picked up by his apparatus at a particular time. When a radiating celestial "body" is spoken of hereinafter, it will be understood that this word is intended broadly enough to cover any aggregation of material in the heavens, no matter how dispersed, providing a relatively localized source of such emanations at a higher intensity level than that existing in surrounding portions of the sky; that is, I intend the word "body" broadly enough to cover not only the sun, but also any other localized source of electro-magnetic radiation, as areas in certain constellations, or even bodies from which such energy may be reflected rather than emanated, as the moon. Certain spiral nebula such as the large one in Andromeda provide useful point sources at night. If the reader desires further amplification with respect to such cosmic energy, as distinguished from the apparatus particularly illustrated and described herein, reference may be had to my paper entitled "Cosmic Static" in vol. 100, No. 3 (Nov. 1944) of the Astrophysical Journal, and to other of my earlier papers to which reference is made in the above-mentioned paper.

My invention, to first describe it in general, comprises collector means for electro-magnetic waves having directional characteristics and so constructed and arranged as to be capable of having its resolving power varied in at least one plane; a mounting for the collector means so arranged as to enable movement thereof about at least one axis, preferably about horizontal and vertical axes; means for amplifying the energy picked up by the collector means; and means for indicating the relative amplitude of such energy at different positions of the collector means as it is moved about one of said axes. With this apparatus I sweep the sky in the general direction in which I expect to find the radiating celestial body, as the sun, with the collector means adjusted to have a low resolving power or wide acceptance pattern in at least one plane. Movement of the collector means direction across the line of propagation of electro-magnetic radiation (the "sight" line of the sun, for example) causes the indicated energy amplitude to rise to a peak and then drop off again. The direction in which the collector means is pointed at the center of this energy amplitude curve then provides an indication of one of the angular positions to be determined, the azimuth if the sky was being swept by movement of the collector means about a vertical axis, the altitude if the sky was being swept by collector means about a horizontal axis. In connection with each of these operations, the resolving power of the collector means is preferably increased to provide a narrow acceptance pattern and the locating step repeated more accurately to determine the angular position of the body being "sighted." From the azimuth of the sun, time being accurately known from a chronometer and the appropriate astronomical tables and calculations being used, longitude may be determined; and from the altitude of the sun, appropriate tables and calculations again being used, the latitude may be determined. That is, equipment of the kind I am here disclosing can be employed, even on a day when it is pouring rain or solidly clouded over, to give angular positions similar to those determined by a sextant when celestial bodies are clearly visible, and navigational computations may thereafter be made in conventional manner.

There are several different types of collector means for electro-magnetic energy which have directional characteristics and which are capable of having their resolving power varied, and I am using the words "collector means" in a sense broad enough to cover any of these various forms. In my article in the Astrophysical Journal mentioned above I illustrate and describe a collector means comprising a sheet metal mirror of approximately 31 feet diameter and 20 feet focal length, with the antenna means being located in a drum at or near the focal point. In that form the resolving power of the collector means is varied by moving the drum toward or away from the mirror, to bring the antenna accurately to the focal point or to position it somewhat away from the focal point. Similarly a so-called antenna array or a plurality of dipole antennas may be used to secure the directional effects with phase relationships between the currents in the various wires being changed to vary the resolving power of the collector. For use on shipboard, however, where I anticipate the greatest use of my navigational instrument, a horn type collector means is capable of meeting the need heretofore specified and has the advantages of being relatively small and rugged. Accordingly, while my invention is much broader than the particular form illustrated in the accompanying drawings, I show and will hereafter limit my description to an instrument embodying my invention comprising a horn-type collector adapted to be mounted on some unobstructed place where the sky can be readily swept, with control and indicating means remote therefrom and adapted to be located in some place more convenient for the operator.

Referring now more particularly to the specific embodiment of my invention illustrated in the accompanying drawings, the collector means is here identified in general as A. This comprises a horn portion identified in general as A', to provide directional effect and to enable variation of the resolving power, as will be hereafter more fully explained, and a conversion portion A" wherein the electro-magnetic waves are converted into voltage variations in an antenna. This collector means is here shown as mounted in some elevated position on a boat where the sky may be swept without obstruction, as on the roof 10 of the pilot house, the mounting being by a yoke and gimbal arrangement enabling pivoting movement of the collector means A around horizontal and vertical axes. In order to maintain the axes horizontal and vertical, the yoke and gimbal mounting is stabilized by a control gyroscope arrangement here identified in general as B. Such controlled gyroscope arrangements are frequently used on shipboard to provide a stabilized horizon or stabilized mounting despite the rolling and pitching of the ship, and since these are conventional they are not specifically illustrated or described here. If it is desired to supplement the present disclosure with respect to such gyroscope and the controls therefor, reference may be had to issued patents in such field, as for example Patent 1,942,737 of January 9, 1934. In the particular embodiment of my invention illustrated in Figure 1, a unit C in some sheltered place convenient for the operator, as on a table in the pilot house, may include a control and indicating panel, control equipment, at least part of the amplifying means, and the like, connection between this unit and the converter portion of the collector means being completed through the flexible cable D.

Referring now more particularly to Figures 3-10, the collector means shown will be described in more detail. The horn includes a rigid frame comprising diverging frame members 11a-d, front transverse frame and guide members 12a-d, rear transverse members 13a-d and intermediate transverse bracing and mounting members 14a-d. This framework is pivotally mounted on the arms 15a and 15b of a yoke, trunnions 16a and 16b rigidly extending from the frame members 14b and 14d being rotatably journalled in appropriate bearings in the upper ends of the arms 15a and 15b of the yoke. In order to provide for movement of the frame, and thus of the collector means A about the horizontal axis provided by the trunnions 16 (assuming the yoke to be maintained vertical by the gyroscope mounting, as is the case), I mount a worm wheel or gear 17 rigidly on the outer end of the trunnion 16a and provide in mesh therewith a worm 18 adapted to be driven by the electric motor 19 remotely controlled from the unit C. This is, of course, a reversible motor; and operation thereof in one direction causes elevation of the forward end of the horn while operation of this motor in the other end causes depressing thereof. The worm 18 and motor 19 are, of course, mounted on appropriate brackets or mounting means fixedly carried by the yoke arm 15a. The yoke 15 is itself pivotally movable about a vertical axis, being mounted rigidly on the upper table portion 20a rotatable on the lower table portion 20b. A worm wheel 21 is fixedly and non-rotatably mounted as on a central stud extending up from the table portion 20b through a central opening in the table portion 20a, and is adapted to be engaged by a worm 22 adapted to be rotated by a reversible electric motor 23 fixedly mounted on the table portion 20a, so that rotation of this motor in one direction or the other, by rotation of the table portion 20a and yoke mounted thereon, causes the horn to sweep the horizon with movement about a vertical axis. The lower table portion 20b, as can be more fully understood by referring to the above-mentioned patent if desired, is mounted, together with its stabilizing gyroscope, in a gimbal arrangement in turn carried by mounting feet 24 fastened to the surface 10.

The horn has truncated triangular sheet metal top, bottom and side portions or flaps 25a-d. These wall portions or flaps are pivotally mounted in the frame members 13 at their back ends, the side flaps 25b and 25d being movable about vertical axes (speaking with respect to the position of the parts as shown in the drawings) coinciding with the planes of the frame members 13b and 13d, respectively; and the top and bottom flaps are movable about horizontal axes in the planes of the frame members 13a and 13c, respectively. That is, as may be best seen in Figure 5, the flap 25a is pivotally mounted at its back end, as by the pin 25a' journalled in the top of the frame member 13b; and the forward ends of these flaps may be moved closer together or farther apart, as may be best seen in Figure 3. In their widest open position the flaps or wall portions of the horn here identified as 25a and 25c would lie in the planes of the frame members 11b and 11c, whereas when they would be moved somewhat closer together they might lie in the positions illustrated in dotted lines in such Figure 3. Similarly, when the flaps 25a and 25c are in wide open position, the side flaps 25b and 25d may be moved in toward each other if desired to change the resolving power in a horizontal plane. At first glance one might think that when the flaps are widest apart, as illustrated, the resolving power would be the lowest and the acceptance pattern the widest in both horizontal and vertical planes; but such is not the case. The resolving power of the horn used in the collector means here disclosed is a function of the number of wave lengths spacing at the front end of the horn (assuming the length of the horn to be greater than the width at its mouth), and the greater the number of wave lengths at the opening the higher the resolving power. That is, when the horn has all of its flaps wide open its resolving power would be greatest and its acceptance pattern narrowest in both horizontal and vertical planes. When the top and bottom flaps 25a and 25c are brought closer together, as illustrated in dotted lines in Figure 3, the resolving power would be decreased and the acceptance pattern would be broader in a vertical plane. The resolving power in this plane would be at its lowest when the flaps 25a and 25c were brought to parallel relationship.

Figure 3:
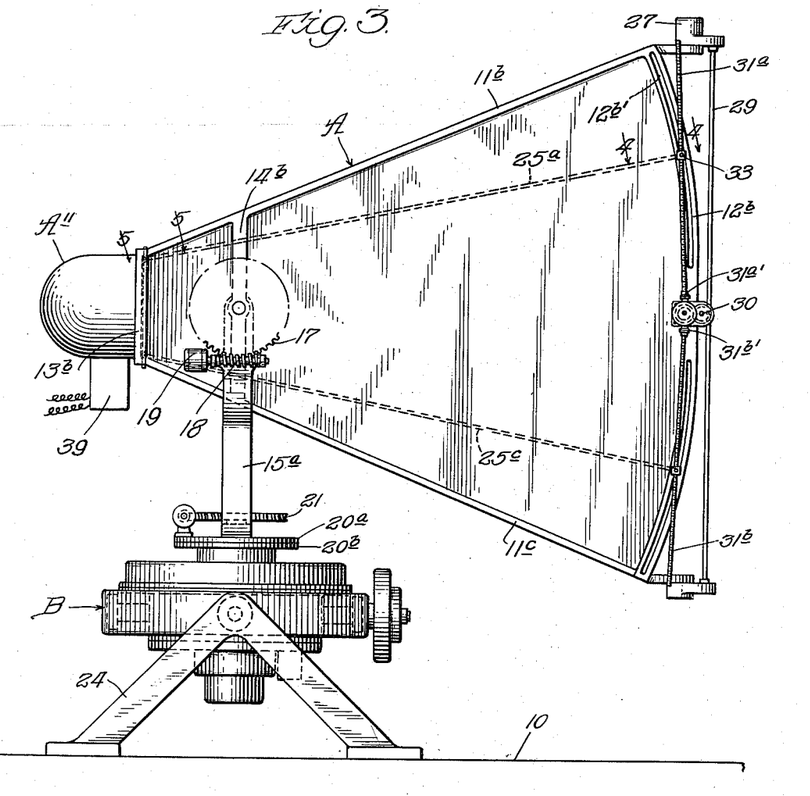
Figure 3 is a side elevational view of the collector means and mounting therefor.
Figures 4, 5:
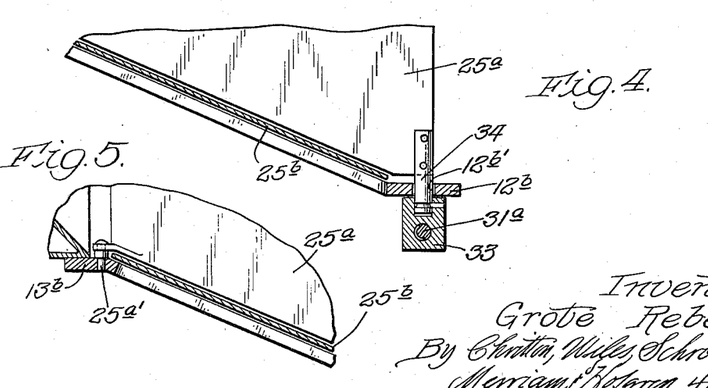
Figure 4 is a fragmentary detail sectional view along the line 4—4 of Figure 3.
Figure 5 is a fragmentary detail sectional view along the line 5—5 of Figure 3.
Figure 6:
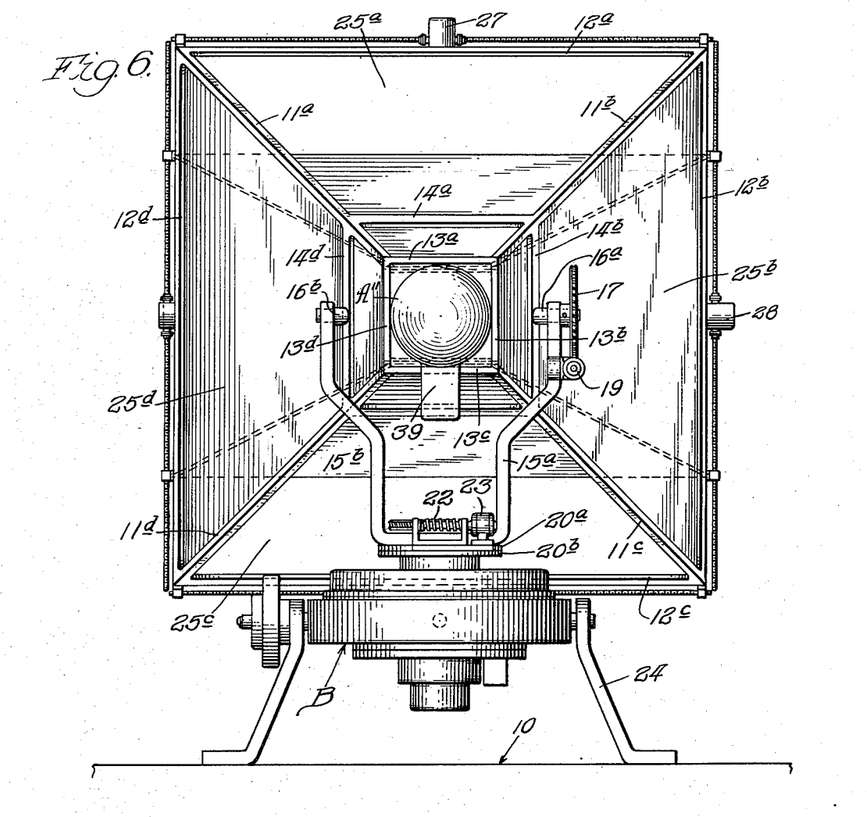
Figure 6 is a rear elevational view of the apparatus shown in Figure 3.
Figure 7:
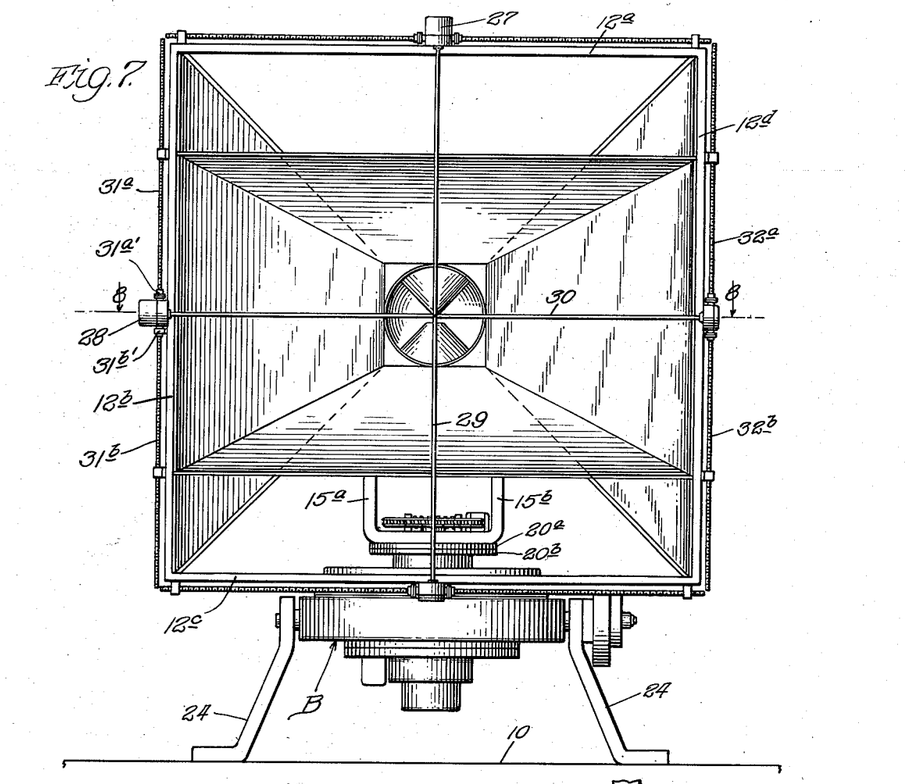
Figure 7 is a front elevational view of the apparatus shown in Figure 6.
Figure 8:
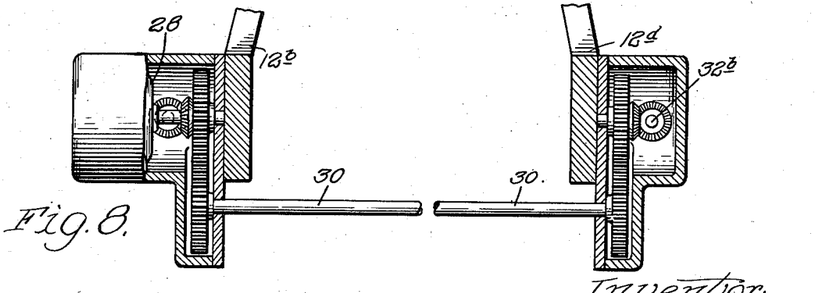
Figure 8 is an enlarged detail view, principally in section and partly broken away, along the line 8—8 of Figure 7.

It is desirable to be able to open and close either pair of flaps selectively from some remote point, as the unit C in the pilot housing, and in order to provided for this I employ flap moving means at the front end of the horn, this means including a motor 27 for moving the side flaps toward and away from each other, and a motor 28 for moving the top and bottom flaps toward and away from each other. While the reference numerals 27 and 28 are for convenience applied to the motor housing in figures such as 3 and 7, reference to Figure 8 will show that these housings contain not only the motor per se but also gearing connected to the non-metallic cross shafts here identified as 29 and 30, which cross shafts may be Bakelite rods. These serve to synchronize connections to threaded flap-moving shafts on opposite sides of the front framework.

That is, referring more particularly to Figure 7, the motor 28 rotates threaded shafts 31a and 31b on its side of the front portion of the frame, and corresponding threaded shafts 32a and 32b on the opposite side. These threaded shafts are connected to their respective driving gear box arrangements by universal joints, as the universal joints 31a' and 31b' for the shafts 31a and 31b respectively, and are threaded into blocks connected to pins mounted on the front end of the flaps at each side thereof and projecting through arcuate slots in the adjacent front frame members 12. That is, as may be best seen in Figure 4, the driving connection between the threaded shaft 31a and the adjacent side of the flap 25a is made by threading the shaft 31a into a block 33 which is in turn pivotally connected to a pin 34 on one side of the forward end of the flap 25a, this pin projecting through an arcuate slot 12b' in the frame member 12b. The threaded shafts, as the shaft 31a, have what may be termed a two-point mounting, one point being at the universal joint connection and the other point being determined by the position of the block 33 as the pin 34 moves in the arcuate slot 12b', the threaded shaft 31a assuming a position or line determined by these two points and providing driving connection for the flaps despite the arcuate movement of the front ends thereof.

Figure 9:
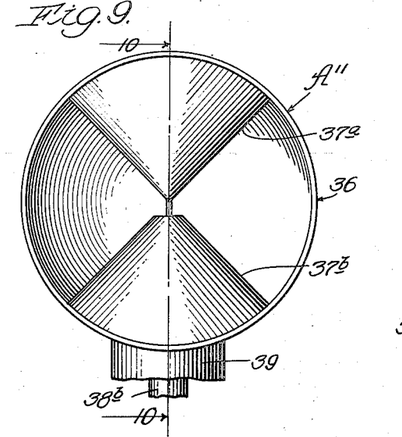
Figure 9 is a front elevational view of the antenna and its enclosure.
Figure 10:
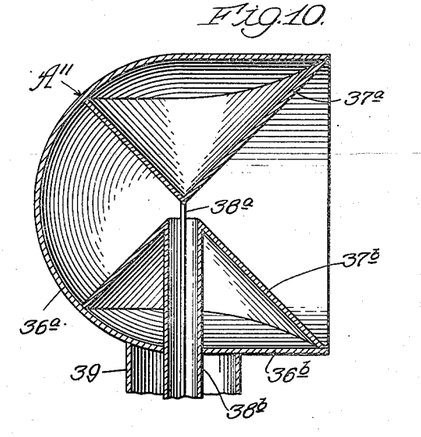
Figure 10 is a vertical sectional view along the line 10—10 of Figure 9.
Figure 12:
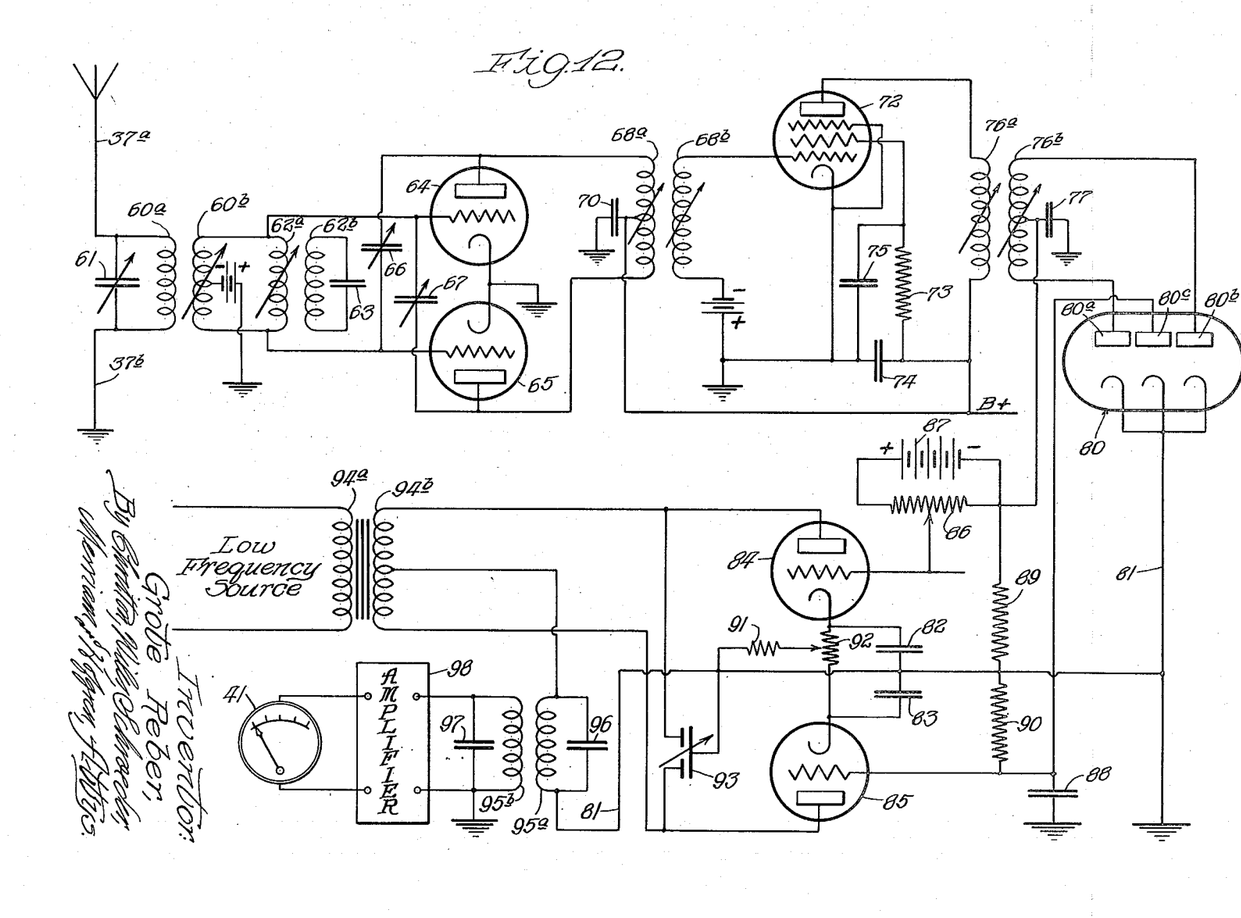
Figure 12 is a circuit diagram of one form of amplifying and indicating circuit which may be used as part of an embodiment of my invention.

Referring now more particularly to Figures 9 and 10, it will be seen that the converter means at the back end or throat of the horn comprises an enclosure 36 having a hemispherical portion 36a and a cylindrical portion 36b. The cylindrical portion should have a diameter approximately that of the throat of the horn, and the dimensions of these parts, and of the hemispherical part 36a of the enclosure, are determined by the wave lengths for which the apparatus is designed. I have found that when using a conical antenna arrangement as illustrated, best results are attained by having the radius of the hemispherical housing portion and cylindrical housing portion multiples, preferably even multiples, of a fraction slightly more than a quarter of the wave length. One quite satisfactory value for the radius of the hemisphere shown in Figure 10 is .533 of the median wave length of the band for which the equipment is designed. The antenna portions 37a and 37b are here shown as 45° cones of revolution with straight sides, although some arcing of the sides, either in or out, may be sometimes used to vary the impedance characteristics of the antenna system. It will be understood, of course, that these antenna parts or cones are of metal, and that the outer enclosure 36 is also comprised of metal. The whole structure is welded or soldered together to give good electrical conductivity. The potential developed by electro-magnetic energy input builds up to a maximum at the tips of the cones, with the maximum voltage differential existing between such tips. I have here shown the energy take-off from the tips of the antenna cones as being through a coaxial cable here shown as comprising the inner conductor 38a and the outer conductor 38b, although it will be understood that any transmission line arrangement may be used. This transmission line preferably has a length comprising an even multiple of the median wave length, and feeds the energy into a preamplifier, here the first stage of an amplifier, which may be housed directly under the converter portion of the collector means in a housing here identified as 39 in Figures 1, 3 and 6. For convenience of illustration, the circuit diagram of Figure 12 is shown as though the entire amplifier were in one place, but it will be understood that one or more stages of this amplifier may be contained in the housing 39 and the remainder contained in the unit C, signal and power connections being completed through the cable D.

Figure 1:
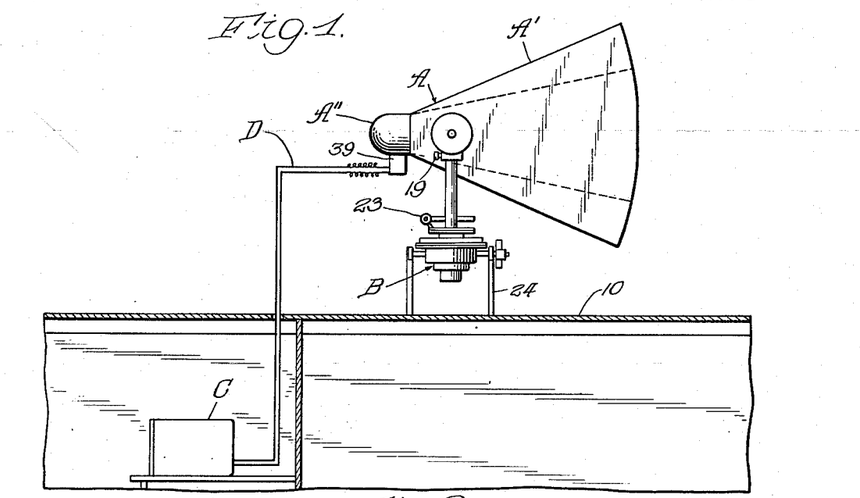
Figure 1 is a view, principally in side elevation but partly in section, of one particular embodiment of my invention mounted in operative position on a ship.
Figure 2:
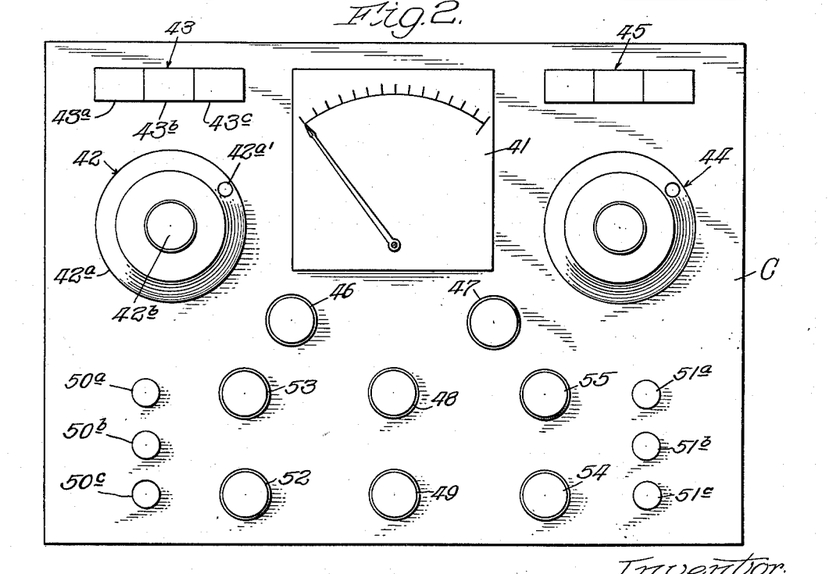
Figure 2 is a front elevational view of the panel of the control equipment portion of my invention.

Referring now more particularly to Figures 1 and 2, the general operation of the system will be described. Figure 2 comprises a view of the control panel of the unit C, and this will first be briefly described. In the center of the upper portion of the panel is a response meter 41, which may be a milliammeter. To the left of this is the altitude control means, indicated in general as 42, and the altitude indicating means, indicated in general as 43. The altitude control 42 comprises a handwheel 42a which may be in direct drive relation or, by operation of shift means 42b, in vernier drive relation to the shaft of a Selsyn control generator within the unit C, this generator being connected to and adapted to effect rotation of the drive motor 19, the motors 19 and 23 controlling the horizontal and vertical movement of the collector means preferably being of the Selsyn type. The indicating means 43 associated with the control means 42 is preferably of the mechanical odometer type direct connected to the shaft of the Selsyn control motor and comprising a first section 43a reading in degrees of altitude, a second section 43b reading in minutes, and a third section 43c reading in seconds. Rotation of the handwheel 42a, either by its rim or by the crank handle 42a', enables the horn to be rotated about a horizontal axis, with indication of the exact position of the horn being provided by the indicator means thereabove. Corresponding manual operating and indicating means for the azimuth are provided on the other side of the response meter, here being identified as the operating means 44 and indicating means 45. This latter means provides controlled and indicated movement of the collector means about its vertical axis. The meter is shown as having zero set and deflection controls 46 and 47 associated therewith, the zero set control enabling compensation for tube noise or shot effect and similar random energy always present, and the deflection control enabling the energy peak to be kept within good readable limits on the scale of the response meter 41.

Figure 11:
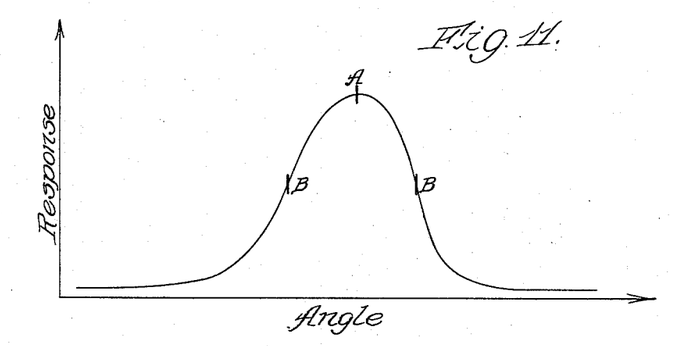
Figure 11 is a representative response curve of the indicating means during use of my invention.

Assuming a "sight" is to be taken on the sun on a day when a solid cloud bank or other atmospheric conditions prevent view thereof, the apparatus would be turned on by pushing the on button 48, subsequent deenergization of the apparatus being effected by an off button 49. With the apparatus "on," inspection of the pilot lights 50a–c and 51a–c at the sides of the control panel would indicate whether the horn walls were fully opened or closed. In the particular arrangement illustrated, the pilot light 50a is green, and if it is lit it indicates that the flaps 25a and 25c are fully open; the pilot light 50b is yellow, and if it is lit it indicates that the motor 28 is operating; and the pilot light 50c is red, and if it is lit it indicates the flaps 25a and 25c to be fully closed. The pilot lights 51 on the other side of the panel are similarly colored and similarly arranged to provide corresponding indications with respect to the side flaps 25b and 25d. If the altitude is to be first determined and the green pilot light 50a is on, the button 52 might be pushed to start operation of the motor 28 in a direction moving the flaps 25a and 25c to closest together or parallel relation, a limit switch turning off the motor and lighting the red pilot light 50c when this condition is attained. The azimuth control 44 would then be manipulated to point the horn in the general vertical plane occupied by the sun, as this would be known in general from the direction of the ship and the time of day, and would generally be to the south when the ship is in the northern hemisphere. The altitude control 42 would then be manipulated in direct drive to swing the collector means up and down about its horizontal axis, and as the direction of the collector means crossed the sun the response meter 41 would provide a direction-amplitude response as illustrated by the curve of Figure 11, wherein the horizontal axis represents angular movement (about a horizontal axis) of the collector means and the vertical axis represents amplitude of energy as indicated by the response meter 41. The approximate angular altitude of the sun having been determined in direct drive, the shaft 42b would be operated to provide a vernier drive, the button 53 pushed to actuate the motor 28 to move the flaps 25a and 25c to widest open position (greatest resolving power in a vertical plane), and the critical portion of the response curve worked over accurately to determine the peak point, identified as A on the curve of Figure 11, the vertical angle of the collector means with respect to the horizontal being shown by the indicator means 43 at this point. If it proves hard to determine the precise peak point of this amplitude curve in this manner, the operator may manipulate the altitude control 42 to determine the points designated as B on the curve of Figure 11 at some predetermined energy level on the steeply dropping sides of the curve. If the angular indications at these two points B are then noted and averaged, a more accurate determination of the exact angle of altitude of the sun may be possible than from a direct reading of the maximum position of the needle of the response meter 41, as the top part of the response curve tends to be rather flat.

I provide electrical interlock relays so that, while the flaps 25a and 25c are in closest together or parallel position, the circuits for operation of the side flaps 25b and 25d are inoperative and vice versa. If the azimuth of the sun is to be accurately determined, however, the altitude adjustment may be left at that corresponding to the altitude of the sun and with the flaps 25a and 25c wide open (as indicated by illumination of the green pilot light 50a), the button 54 might be pushed to actuate the motor 27 and move the side flaps together to a point of lowest resolving power. The azimuth control 44 could then be operated to the point where the maximum energy response was indicated on the meter 41. The button 55 would then be pushed to open the flaps 25b and 25d through operation of the motor 27 to their widest position (greatest resolving power), and the azimuth control then moved to vernier drive and the critical portion of the response curve worked over accurately to determine the azimuth angle at a given time, which time would, of course, be accurately determined from a chronometer. With the two angular positions of solar altitude and azimuth thus given, right ascension and declination of the sun taken from a nautical almanac, and the time from a chronometer, the position of the ship could then be determined in terms of latitude and longitude by appropriate tables and computations. It will be readily apparent that by the use of the navigational instrument which I have disclosed and am here claiming, navigational "sights" may be taken as often as it is desired to check position, regardless of atmospheric conditions. Moreover, at radio wave lengths above 100 megacycles, and preferably above 1,000 megacycles, the energy is capable of penetration of the worst type of absorption conditions presented by dust or water in the atmosphere, and yet the lines of approach of the electro-magnetic waves have optical accuracy in that they are not deviated from a straight line by atmospheric conditions. Preliminary observations and experiments which I have made from a known predetermined position on the earth's surface indicate a high degree of accuracy of determination of the angular positions of a radiating celestial body such as the sun, so that there is approximately no deviation of its electro-magnetic waves by the Heaviside layer or any other layer or condition of the atmosphere.

The energy levels are so low and the frequencies preferred in the practice of my invention so high that careful attention must be given to the design and construction of amplifiers for the received energy. While it is by no means the only form of amplifying and indicating circuit which may be used, Figure 12 is a circuit diagram of a preferred amplifying and indicating arrangement adapted to take energy picked up by the collector means and give the desired indication therefrom. Referring now more particularly to this circuit diagram, the cone antenna portions 37a and 37b are illustrated schematically as antenna and ground, these being coupled (by the co-axial cable or other transmission line, in practice) to a tuned circuit here shown as comprising the primary 60a of a radio frequency transformer having the center tapped secondary 60b, this being capable of variation in some manner, as by movable powdered iron cores. With the circuit designed for a frequency of 480 megacycles, the primary 60a might have an inductance of .002 mh. (microhenry) and be tuned by a shunt condenser 61 of 55 mmf. (micromicrofarad). The center tap is connected to ground through an appropriate bias battery, as for example 6 volts; and is here shown as connected to another open ended or balancing circuit. This comprises a radio frequency transformer having the secondary 62b and primary 62a. All three coils 60b, 62a and 62b might have an inductance of about .07 mh., for example, and the condenser 63 might have a value of 1.6 mmf. Energy is taken off from the two opposite ends of the coil 60b to the signal grids of a pair of triode tubes 64 and 65 arranged as a push-pull neutralized amplifier stage. These tubes 64 and 65 may, for example, be tube type No. 955, and the variable condensers 66 and 67 used for neutralizing purposes should have a value in the neighborhood of 1.6 mmf. The output of this push-pull stage is taken off through a tuned output circuit comprising the center tapped inductance 68a, which may be of .07 mh. tuned by a suitable core and paralleled by the inter-element capacity of tubes 64 and 65 to provide a tuned circuit for operation at and around 480 megacycles. The center tap of the coil 68a is connected to the plate supply source which may provide 250 volts, and is by-passed to ground through the condenser 70, which may have any appropriate value, as for example 250 mmf. The coil 68a forms the primary of a radio frequency transformer having a secondary 68b also tuned to 480 megacycles. The coil 68b may again have a permeability tuned inductance of .03 mh. and provide a single ended input into the signal grid of a tube 72 here illustrated as a pentode as for example tube type No. 954. This tube would be arranged in the circuit in a manner appropriate to its characteristics, as for example being connected to the 250 volt plate supply, having a 3 volt negative bias on the signal grid, having a 100,000 ohm screen grid resistor 73, and 250 mmf. plate and screen grid by-pass condensers 74 and 75. The output may be delivered through a permeability tuned radio frequency transformer having a primary 76a and a secondary 76b, the latter being center tapped and connected to ground through a 250 mmf. condenser 77. Again, for the frequency band chosen for operation of this system, the coils 76a and 76b might each have an inductance of .04 mh. While the circuit is shown as including only one single ended amplifying stage just described, it will be understood that this is merely for simplicity of illustration and that in practice there would be several of such stages in cascade. The capacities necessary to bring coils 60b, 62a, 68a, 68b, 76a and 76b into tune are supplied by the interelectrode capacities of various tubes in question. Figure 12 shows the coils 60a–76b as lumped constant circuit elements for simplicity. Due to very small inductances involved it is desirable to construct these elements from short sections of line in practice. For more detail on proportioning of such circuits see my article in "Electronic Industries" entitled "Amplifiers" on pages 89–92, April 1944.

The output of the radio frequency amplifying portion of the circuit just described is delivered to a detector or full wave rectifying stage here shown as comprising a special triple diode tube 80. The two anodes 80a and 80b are shown as connected to the opposite ends of the center tapped secondary coil 76b, to be alternately positive, so that a pulsating D. C. current appears in the lead 81 from the tied-together cathodes of the tube 80. This lead 81 is connected, through .01 mf. condensers 82 and 83, to the cathodes of a pair of triode tubes 84 and 85 arranged in push pull. The signal grid of the tube 84 is connected to the center of the secondary coil 76b through a biasing arrangement comprising a potentiometer 86 energized by a low voltage battery 87, which may have a voltage as low as one volt. The signal grid of the tube 85 is connected to the third anode 80c of the tube 80, a condenser 88, which may have a capacity of 250 mmf., acting as a by-pass to ground. Appropriate grid resistors 89 and 90 are connected between the grids and cathodes of the tubes 84 and 85, as for example with a resistance of 20,000 ohms each. Proper balancing of the tubes of this stage may be effected through variation of the point of connection of the resistor 91, which may have a value of 15,000 ohms, to the resistor 92, which may have a value of 5,000 ohms. The rotor of a split stator variable condenser 93 is grounded, this condenser having one stator section connected to the plate lead of the tube 84 and the other to the plate lead of the tube 85. This condenser, for example, may have a capacity of about 20 mmf. when used in the circuit shown and with tubes of tube type No. 6F5 in this stage, all of the values being given for such tubes.

The plates of the tubes 84 and 85 are here shown as energized with an alternating current potential from the transformer having a primary 94a and a center tapped secondary 94b. The primary of this transformer may be connected to any convenient source of a frequency low enough to be amplified relatively stably in a conventional alternating current amplifier, as for example a 10,000 cycle oscillator. An alternating current connection is made to the cathodes of the tubes 84 and 85 (through the lead 81) and current flowing in this circuit is passed through a tuned transformer here shown as having the primary 95a and the secondary 95b. Each of these coils might have an inductance of 25,000 mh. and be tuned by condensers 96 and 97 of a capacity of 0.1 mf., for example, for a 10,000 cycle frequency. One side of the primary coil 95a is connected to the cathode lead and the other side is connected to the center tap of the coil 94b. The 10,000 cycle output developed in the secondary 95b as a result of reception of a signal in the collector means is then passed through an amplifier 98, which may be a conventional resistance coupled amplifier designed for stable operation at 10,000 cycles per second, and delivered to the A. C. response meter 41. The amplifier 98 would include a potentiometer or similar volume control as the deflection control 47, and any type of appropriate zero set control would be provided initially to bring the meter reading to zero. The plate transformer of the push-pull stage comprising the tubes 84 and 85 is preferably of the shielded type with a carefully balanced secondary, as it is important to keep the 10,000 cycle frequency out of the circuit except as a plate supply means.

Initial adjustment of the circuit constants is so made that the electron velocity potential effect in the tube 80 between the cathode and the anode 80c is equal to that between the cathode and the anodes 80a and 80b, so that in the absence of energy input to the rectifier means the tubes 84 and 85 are in balanced condition. Then the value of potentiometer 86 is adjusted exactly to balance any tube noise energy which may be coming through the circuit, particularly from the first stage. These adjustments place the circuit in condition such that it is ready to provide an indication of variations in energy as the collector means is moved about one or the other of its axes of motion. When electromagnetic energy from a celestial body reaches the collector means and is converted into alternating voltage by the antenna, this radio frequency voltage is amplified through the radio frequency portion of the circuit and rectified in the tube 80 to appear as a bias (or rather, a change in bias) on the grid of the tube 84. When both of these tubes 84 and 85 were in balance they did not develop any effective 10,000 c. p. s. current in the lead 81 because of the alternating potential applied to their plates, as with a properly balanced and shielded secondary 94b these waves were exactly equal and balanced each other out. Change in bias of the tube 84, however, causes it to operate at a different point on its characteristic curve (the tubes would preferably be operating in straight line portions of the characteristic curve) and this causes one of the tubes to pass more energy than the other. Accordingly, the pulsating D. C. current being passed through the primary 95a will have a higher value on one pulse, as for example when the tube 85 is conducting, than on the other pulse, and the resultant will be a wave with a frequency component of 10,000 cycles. The amplitude of this component will be determined by the amount of signal energy reaching the collector means. This provides a very effective method of securing final amplification at a relatively low and stable frequency, yet with a response which is linearly related to the energy reaching the antenna portion of the collector means, this linear relationship being maintained by the use of diode detection and by operation of the tubes 84 and 85 on straight line portions of their characteristic curves. This enables a rather rugged meter to be used as the response meter 41, avoiding the necessity of extremely sensitive, and thus also extremely fragile response meter construction, as would be necessary if an attempt were made to provide the indication directly from the rectified energy delivered by the tube 80.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. The method of determining an angular position of a radiating celestial body by the use of a directional collector, comprising: adjusting said collector to have a wide receiving acceptance pattern; moving said collector about an axis while it is adjusted to have said wide acceptance pattern and is receiving electro-magnetic waves emanating from said celestial body; amplifying the received waves in a frequency band in the radio spectrum above one hundred magacycles; separately integrating the voltages of two substantially continuous spectra, one being the received waves and the other being internal noise; indicating the difference between said integrations and detecting differences therebetween to determine the approximate direction of said collector when maximum desired energy is being received thereby; adjusting said collector to have a narrow receiving acceptance pattern and again moving it about said axis; and again amplifying the desired received energy and similarly integrating voltages and indicating the difference therebetween more accurately to determine the direction of said collector when maximum energy is being received thereby.

2. The method of determining an angular position of a radiating celestial body by the use of a directional collector, comprising: adjusting said collector to have a wide receiving acceptance pattern; moving said collector about an axis while it is adjusted to have said wide acceptance pattern and is receiving electro-magnetic waves emanating from said celestial body; amplifying the received waves and actuating an indicator therefrom to determine the approximate direction of said collector when maximum desired energy is being received thereby; adjusting said collector to have a narrow receiving acceptance pattern and again moving it about said axis; and again amplifying the desired received energy and similarly actuating an indicator therefrom more accurately to determine the direction of said collector when maximum energy is being received thereby.

3. The method of determining the angular position of a radiating celestial body by the use of a directional collector, comprising: moving said collector about a vertical axis while it is receiving electro-magnetic waves emanating from said celestial body; amplifying the received waves in a frequency band in the radio spectrum above one hundred megacycles; separately integrating the voltages of two substantially continuous spectra, one being the received waves and the other being internal noise; indicating the difference between said integrations and detecting differences therebetween to determine the azimuth of said celestial body when maximum desired energy is being received by said collector; moving said collector about a horizontal axis while it is receiving electro-magnetic waves emanating from said celestial body; amplifying the received waves in a frequency band in the radio spectrum above one hundred megacycles; separately integrating the voltages of two substantially continuous spectra, one being the received waves and the other being internal noise; and indicating the difference between said integrations and detecting differences therebetween to determine the elevation of said celestial body when maximum desired energy is being received by said collector.

4. The method of determining the angular position of a radiating celestial body by the use of a directional collector, comprising: moving said collector about a vertical axis while it is receiving electro-magnetic waves emanating from said celestial body; amplifying said received waves; separately integrating the voltages of two substantially continuous spectra, one being the received waves and the other being internal noise; indicating the difference between said integrations and detecting differences therebetween to determine the azimuth of said celestial body when maximum desired energy is being received by said collector; moving said collector about a horizontal axis while it is receiving electromagnetic waves emanating from said celestial body; amplifying said received waves; separately integrating the voltages of two substantially continuous spectra, one being the received waves and the other being internal noise; and indicating the difference between said integrations and detecting differences therebetween to determine the elevation of said celestial body when maximum desired energy is being received by said collector.

5. The method of determining the angular position of a radiating celestial body by the use of a directional collector, comprising: moving said collector about a vertical axis while it is receiving electro-magnetic waves emanating from said celestial body; amplifying said received waves and actuating an indicator therefrom to determine the azimuth of said celestial body when maximum desired energy is being received by said collector; moving said collector about a horizontal axis while it is receiving electromagnetic waves emanating from said celestial body; and amplifying said received waves and actuating an indicator therefrom to determine the elevation of said celestial body when maximum desired energy is being received by said collector.

6. Navigational apparatus of the character described for determining the altitude and azimuth of a radiating celestial body, including: a directional collector for receiving electro-magnetic waves having portions separately movable for separately varying the resolving power thereof in both horizontal and vertical planes; a mounting for said collector so constructed and arranged as to provide for movement thereof about horizontal and vertical axes; motor means for moving said collector about said axes; indicators for indicating the vertical and horizontal positions of said collector; an amplifier connected to said collector for amplifying electro-magnetic waves; means connected to said amplifier for separately integrating and detecting differences between the voltages of two substantially continuous spectra, one being the received waves and the other being internal noise; and an indicator for indicating the position of maximum radiation reception.

7. Navigational apparatus of the character described for determining the altitude and azimuth of a radiating celestial body, including: a directional collector for receiving electro-magnetic waves; a mounting for said collector so constructed and arranged as to provide for movement thereof about horizontal and vertical axes entirely across said body; motor means for moving said collector about said axes; indicators for indicating the vertical and horizontal positions of said collector; an amplifier connected to said collector for amplifying electromagnetic waves; means connected to said amplifier for separately integrating and detecting differences between the voltages of two substantially continuous spectra, one being the received waves and the other being internal noise; and an indicator for indicating the position of maximum radiation reception.

8. Navigational apparatus of the character described for determining the altitude and azimuth of a radiating celestial body, including: a directional collector for receiving electro-magnetic waves having portions separately movable for separately varying the resolving power thereof in both horizontal and vertical planes; a mounting for said collector so constructed and arranged as to provide for movement thereof about horizontal and vertical axes; motor means for moving said collector about said axes; indicators for indicating the vertical and horizontal positions of said collector; an amplifier connected to said collector for amplifying electro-magnetic waves; and an indicator connected to said amplifier for indicating the position of maximum radiation reception.

9. Apparatus of the character claimed in claim 7, wherein said collector comprises a metal horn, an enclosure at the throat thereof having the form of a section of a sphere, and conical dipole antenna members in said enclosure.

10. Apparatus of the character claimed in claim 8, wherein said collector comprises a metal horn having at least two opposite sides relatively movable with respect to each other, an enclosure at the throat thereof having the form of a section of a sphere, and conical antenna means in said enclosure.

11. Apparatus of the character claimed in claim 7, wherein said collector comprises a metal horn, an enclosure at the throat thereof having the form of a section of a sphere of a radius comprising a multiple of .533 times the wave length for which the equipment is designed, and antenna means in said enclosure.

GROTE REBER.

REFERENCES CITED

The following references are of record in the file of this patent:

UNITED STATES PATENTS

| Number | Name | Date |
| --- | --- | --- |
| 1,769,100 | Beal et al. | July 1, 1930 |
| 2,206,683 | Wolff | July 2, 1940 |
| 2,231,929 | Lyman | Feb. 18, 1941 |
| 2,235,506 | Schelkunoff | Mar. 18, 1941 |
| 2,283,935 | King | May 26, 1942 |
| 2,304,446 | Eaton | Dec. 8, 1942 |
| 2,332,919 | Kleen | Oct. 26, 1943 |
| 2,361,956 | Moseley | Nov. 7, 1944 |
| 2,369,622 | Toulon | Feb. 13, 1945 |
| 2,410,831 | Maybarduk | Nov. 12, 1946 |
| 2,412,612 | Godet | Dec. 17, 1946 |
| 2,415,094 | Hansen et al. | Feb. 4, 1947 |
| 2,419,556 | Feldman | Apr. 29, 1947 |

FOREIGN PATENTS

| Number | Country | Date |
| --- | --- | --- |
| 114,368 | Australia | Dec. 9, 1941 |

OTHER REFERENCES

Proceedings of the Institute of Radio Engineers, vol. 27, No. 1, January 1939. The Sectoral Electromagnetic Horn by Barrow and Lewis, pages 41 to 50 (pages 41 and 42 relied upon in this action).

Certificate of Correction

Patent No. 2,519,603　　　　　　　　　　　　　　　　August 22, 1950

GROTE REBER

It is hereby certified that error appears in the printed specification of the above numbered patent requiring correction as follows:

Column 12, line 9, for "0.1 mf." read *.01 mf.*;

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*